United States Patent [19]
Nelson

[11] Patent Number: 5,445,754
[45] Date of Patent: Aug. 29, 1995

[54] WATER-BASED, THERMAL PAINT

[75] Inventor: Neil R. Nelson, Inverness, Fla.

[73] Assignee: P.S.A.M.S., Inc., Inverness, Fla.

[21] Appl. No.: 218,758

[22] Filed: Mar. 28, 1994

[51] Int. Cl.$^6$ ............................................. C09D 5/02
[52] U.S. Cl. .................................. 252/62; 106/14.11;
106/15.05; 106/18.12; 106/18.3; 252/609;
252/610; 428/457; 428/920; 523/122; 524/444
[58] Field of Search ................... 106/13, 14.11, 14.41,
106/14.44, 15.05, 18.12, 675, DIG. 2, 18.3;
252/62, 601, 610; 428/920, 457; 524/444;
523/122

[56] References Cited

U.S. PATENT DOCUMENTS

| | | | |
|---|---|---|---|
| 3,886,076 | 5/1975 | Venable | 106/DIG. 2 |
| 4,074,010 | 2/1978 | Knight | 428/422 |
| 4,155,887 | 5/1979 | Hetson | 106/204 |
| 4,190,547 | 2/1980 | Mahnke et al. | 106/15.05 |
| 4,267,092 | 5/1981 | Glaser et al. | 54/5 |
| 4,602,265 | 7/1986 | Philpott et al. | 427/148 |
| 4,673,697 | 6/1987 | Rowley | 106/15.05 |
| 4,761,310 | 8/1988 | Boaz | 427/314 |
| 4,775,534 | 10/1988 | Bartlett et al. | 106/15.05 |
| 4,889,747 | 12/1989 | Wilson | 106/DIG. 2 |
| 4,904,503 | 2/1990 | Hilton et al. | 106/15.05 |
| 5,090.983 | 2/1992 | Boaz | 65/25.4 |

*Primary Examiner*—Anthony Green
*Attorney, Agent, or Firm*—Shook, Hardy & Bacon

[57] ABSTRACT

A water-based latex paint is provided which has, among other things, a perlitic component. The paint resists thermal loading and loss. A series addition of components provides the paint efficiently. The paint is useful for many substrates, including metals.

10 Claims, No Drawings

WATER-BASED, THERMAL PAINT

FIELD OF THE INVENTION

The present invention concerns a water-based, thermal paint, which may be considered to contain a ceramic or an inorganic insulative component, as well as making and using the paint.

BACKGROUND OF THE INVENTION

Various paints are known, some of which are ceramic.

For example, U.S. Pat. No. 4,074,010 to Knight discloses ceramic-paint coatings, which are multi-layered in nature. Such coatings are made by applying finely-divided material such as 100-micron silica to ceramic paint while it is still wet, curing without fusing the paint, and then applying another coat of ceramic paint.

U.S. Patent Nos. 4,761,310 & 5,090,983 to Boaz disclose a method of bonding an oil-based ceramic paint to a surface of a glass sheet, and a metal enriched scratch resistant ceramic paint, respectively. The latter paint applies to glass as well.

In buildings, particularly those which have a significant amount of exposed metal components, the phenomena of heat loading or loss such as caused by solar radiation or radiative heat loss can be problematical. For instance, metal roofs, to include those painted with conventional paints, can under the influence of solar radiation undergo rapid expansion to the point where significant separation can occur from other structural components causing openings which allow water leaks, wind and wind-carried abrasive weathering, and even loss of the roofing under high wind loads. In general, a rapid gain or loss of heat, particularly from metal building components, which can expand or contract dramatically with the rapid gain or loss in heat, is undesirable. A more moderate gain or loss of heat might be acceptable, but one has little, if any, control of the elements, in particular in the environment where a building structure resides.

As well, metal, to include metal painted with conventional paint, is a notorious heat conductor, which allows for excessive heat loss from the building system on cold days, or excessive heat gain on hot days. Accordingly, it can become economically inefficient and environmentally undesirable to have a building which engenders such problems. Of course, metal is a valuable structural component of many buildings and is desirable in many types of building construction. Thus, the problem becomes one of adapting to such employment of metal, and ameliorating or overcoming its drawbacks, in buildings.

Desired properties of paint, in general, include good adhesion, coverage and hiding. In addition, the paint should be tough, resistant to scratching and weathering, and flexible.

SUMMARY OF THE INVENTION

It is an object of the present invention to provide a water-based, insulative paint.

It is a more particular object hereof to provide such a paint which provides an effective barrier to radiative heat gain or heat loss.

It is another object of the invention to provide such a paint which can be effectively applied to building surfaces, to include those of metal.

It is also an object of the invention to provide such a paint which has good adhesion, coverage and hiding.

It is a further object of the invention to provide such a paint which is flexible and yet has toughness and resistance to scratching and weathering.

To accomplish these and other related objects of the invention, the present invention provides, in one aspect, a water-based insulative paint comprising an emulsified aqueous mixture which contains the following components:

A) A substantial amount of a vinyl acetate-dibutyl maleate type film forming agent;
B) An amount of water sufficient to assist in mixing the other components and to assist in keeping the paint in a state suitable for application;
C) A high refractive index pigment and an extender;
D) A mildewicide/corrosion inhibitor;
E) A perlitic insulative agent;
F) A dialkyl ester and ester alcohol plasticizing-/coalescing agent;
G) A polyalkene flexibilizing agent;
H) A surfactant to generally include a wetting agent and an anionic dispersant;
I) A defoaming agent;
J) A glycol freeze/thaw stabilizer. In another aspect, a method of making said paint comprises serially carrying out the following steps:

A) Mixing together water, a first stage defoaming agent, a wetting agent, and an anionic dispersant to provide a first intermediate mixture;
B) Adding to the first intermediate mixture and mixing together a dialkyl ester plasticizing/coalescing agent, a glycol freeze/thaw stabilizer, a polyalkene flexibilizing agent, and an ester alcohol plasticizing-/coalescing agent to provide a second intermediate mixture;
C) Adding to the second intermediate mixture and thoroughly mixing a high refractive index pigment to provide a third intermediate mixture;
D) Adding to the third intermediate mixture and thoroughly mixing at least one extender, provided that if more than one extender is added the incipient mixture is thoroughly mixed after addition of the first extender and before addition of any subsequent extender, and adding thereto a mildewicide/corrosion inhibitor, and mixing further to provide a fourth intermediate mixture;
E) Adding to the fourth intermediate mixture and mixing a minor portion of a vinyl acetate-dibutyl maleate type film forming agent and further adding with further mixing to at least substantial uniformity a perlitic insulative agent to provide a fifth intermediate mixture; and
F) Adding to the fifth intermediate mixture a major portion of a vinyl acetate-dibutyl maleate film type forming agent and a final stage defoaming agent, and mixing to provide said paint.

The paint of the invention is useful in protecting buildings and other structures, particularly components thereof which are made of metal to include steels and so forth, and the applied paint and substrate composition is a further aspect of the present invention. Significantly, the paint of the invention provides not only good heat insulation, but also good adhesion, especially to metals, coverage, hiding, toughness and resistance to scratching and weathering, and flexibility. The method quite surprisingly affords a desirable paint mixture, and its steps when taken out of turn do not afford such a desirable paint. The present invention can ameliorate or solve problems in the art, to include as aforesaid, and it fulfills objects of the invention.

Numerous further advantages attend the invention.

ILLUSTRATIVE EMBODIMENTS OF THE INVENTION

The aforementioned Knight and Boaz patents are incorporated herein by reference.

The paint hereof is a water-based, insulative formulation. It is an emulsified mixture and may be considered to be a latex.

The paint hereof contains a substantial amount of a vinyl acetate-dibutyl maleate, or the like, i.e., type, component. This component is a copolymer and functions as a film forming agent. It is often provided in an aqueous media as the reaction product of an emulsion polymerization, wherein the polymer makes up about from 54 to 56 percent of the weight of the media. Typically, this film forming agent makes up the largest part of the paint.

The paint hereof contains an amount of water sufficient to assist in mixing the other components and to assist in keeping the paint in a state suitable for application. Typically, this water is added to make up a substantial part of the paint, often only second in amount to the film forming agent and sometimes approximate in amount to the filler and pigment component.

The paint hereof contains a high refractive index pigment and an extender, present in any suitable amount. The pigment may be any suitable pigment having a high refractive index, to include white, black and/or colored pigments. The refractive index of the pigment is generally above 1.5. Organic pigments such as lampblack, phthalocyanine blue or Hansa yellows, and so forth, and inorganic pigments such as white lead carbonate or sulfate, zinc oxide (which may function as a mild mildewicide as well), iron oxide, chromium oxide, titanium dioxide, and so forth, may be employed. Preferably, the pigment has an index of refraction of about 2.5 or greater and is considerably light reflective. For example, the high refractive index pigment can be or contain titanium dioxide, which may be either of the anatase form (index of refraction 2.55) or the rutile form (index of refraction 2.7) or be of both forms, and of a general particle size about from 0.2 to 0.3 or so microns in diameter. In practice, the titanium dioxide is about 0.28 microns in diameter with some variation in particle size. Ratios of the forms of titanium dioxide can vary, if the forms are mixed. The ratio of anatase to rutile may be included within the following general ratios: 0:1; 1:10; 2:5; 1:2; 1:1; 2:1; 5:2; 10:1. Preferably, a completely rutile (nonchalking) sample of titanium dioxide is employed as the pigment to the exclusion of the anatase (chalking) form. The pigment can be provided in a water slurry. The extender, which may be also known as a filler, can be any suitable material, to include inorganic extenders such as silicates to include talc (magnesium silica), silica, clay, mica, and so forth and the like. Preferably, the extenders are composed of a mixture of fillers such as, for example, aluminum silicate and ground mica. The size of extender particles may vary with the application, and may be found within particles of a size about from 2.0 microns to 75 microns in diameter. Typically, the high refractive index pigment and extender together make up a substantial part of the paint, often only second or third in amount to the film forming agent and sometimes approximate in amount to the water component.

The paint hereof contains a mildewicide/corrosion inhibitor, present in any suitable amount. Herein, by the term "mildewicide/ corrosion inhibitor" is meant material which can function either as an agent for the kill or control of microorganisms such as mildew or the like, hence, the material simply being referred to herein as a mildewicide, or as an agent which can inhibit corrosion, or the material can function as both a mildewicide and a corrosion inhibitor. Accordingly, suitable materials include numerous compounds and compositions known to those of skill in the art. Among the mildewicides, for instance, in addition to zinc oxide, mercurial, copper, and phenolic compounds are among those in use. Some corrosion inhibition is provided by the pigment. Because of possible restrictions on use of lead, mercury compounds, and chromates, some corrosion inhibitors may include divided zinc metal, zinc oxide, molybdates, phosphates, metallic naphthalenates to include copper naphthenate, and so forth. However that may be, barium metaborate monohydrate is the preferred mildewicide/corrosion inhibitor. Typically, the mildewicide/corrosion inhibitor makes up a less substantial part of the paint than the foregoing components, but often is only less in amount to the water component or the filler and pigment component.

The paint hereof contains a perlitic insulative agent, present in any suitable amount. This is preferably an expanded perlitic material. For example, the insulative agent can be expanded perlite. The insulative agent is a prime provider of thermal resistance in the paint of the invention. Preferably, it is uniformly distributed throughout the paint. Typically, the perlitic insulative agent makes up a surprisingly small amount of the paint to achieve its thermally resistant effect, often approximately about or even less in amount than the mildewicide/corrosion inhibitor.

The paint hereof contains both dialkyl ester and ester alcohol plasticizing/coalescing agents, present in any suitable amount. Herein, by the term "plasticizing-/coalescing agent" is meant material which can function either as a plasticizer or a coalescent, or the material can function as both. In general, these agents are chosen to plasticize the latex temporarily during film formation so that the latex particles coalesce. They may be considered temporary plasticizers to facilitate coalescence of the latex polymer, and are typically adsorbed by the latex particles in the wet paint. Hence, they soften the polymer to require less force to coalesce while the film is drying. Accordingly, suitable materials include numerous dialkyl ester and ester alcohol compounds and compositions known to those of skill in the art. For instance, the dialkyl ester may be a dibutyl ester such as, for example, dibutyl phthalate, and the ester alcohol may be a non-fatty-alcoholate alcoholic ester such as, for example, 2,2,4-trimethyl-1,3-pentanediolisobutyrate. Typically, the plasticizing/coalescing agent makes up a small amount of the paint to achieve the desired effect, often near or less in amount than the mildewicide/corrosion inhibitor or the perlitic insulative agent.

The paint hereof contains a polyalkene flexibilizing agent, present in any suitable amount. This agent imparts flexibility to the dry film. Accordingly, suitable flexibilizing agents can include such a polyalkene as, for example, polybutene, or other suitable polyalkenes known to those of skill in the art. Typically, the polyalkene flexibilizing agent makes up a small amount of the paint to achieve the desired effect, often less in amount than the mildewicide/corrosion inhibitor or the perlitic insulative agent.

The paint hereof contains a surfactant, of a suitable type and present in any suitable amount. In general, the surfactant includes employment of both a wetting agent and an anionic dispersant. Preferably, the wetting agent is an aralkyletheralcohol which can be a substance such as, for example, octylphenoxypolyethoxyethanol. The anionic dispersant may be categorized broadly as a detergent. Preferably, the anionic dispersant is an acrylate oligimer/polymer, and/or an alkali metal salt thereof. Typically, the surfactant makes up a small amount of the paint to achieve the desired effect, often near or less in amount than the polyalkene flexibilizing agent.

The paint hereof contains a defoaming agent, of any suitable make-up and present in any suitable amount. The defoaming (antifoaming) agent reduces foaming of the paint, which may unduly interfere with processing and/or application. Some examples of known defoaming agents are 2-octanol, sulfonated oils, organic phosphates, silicone fluids, dimethylpolysiloxane, and so forth. Preferably, a plurality of defoaming agents is employed herein, to include a first stage defoaming agent and a final stage defoaming agent. The first stage defoaming agent is typically employed by addition in the first stages of manufacture of the paint, and may be generally of the class of compounds or compositions known to be silicon-free. The final stage defoaming agent is typically employed by addition in the final stages of manufacture of the paint, and may be generally of the class of compounds or compositions known to be a nonionic blend of mineral oils and silica derivates, an example of which is available from Drew Chemical Corp. under the designation DREW DEFOAMER L-475. Typically, the defoaming agent makes up a small amount of the paint to achieve the desired effect, often present in an amount approximately near to the amount of the aforesaid surfactant.

The paint hereof contains a glycol freeze/thaw stabilizer, present in any suitable amount. Although it is the practice to avoid shipping or storing latex paints at below freezing temperatures, some safety factor is desirable. Accordingly, a glycol such as ethylene glycol (1,2-ethanediol) or propylene glycol (1,2-propanediol) is employed. Preferably, the glycol freeze/thaw stabilizer is 1,2-ethanediol. This component also contributes to maintaining a longer "wet-edge" during application which is meant a longer period during which the fluidity of the paint under the brush or roller is maintained without becoming unworkably viscous. Typically, the glycol freeze/thaw stabilizer makes up a small amount of the paint to achieve the desired effect, often present in an amount near to or less than the amount of the aforesaid surfactant or defoaming agent.

The following table illustrates some ranges that components of the paints may generally be found about, in parts by weight:

| Paint Component | General Range | Preferred Range |
| --- | --- | --- |
| Film forming agent | 40 to 60 | 45 to 55 |
| Water | 10 to 25 | 12 to 18 |
| High refractive index pigment | 3 to 12 | 5 to 9 |
| Extender | | |
| Silicate | 2 to 10 | 4 to 8 |
| Mica | 1 to 8 | 2 to 5 |
| Mildewicide/corrosion inhibitor | 2 to 10 | 4 to 8 |

-continued

| Paint Component | General Range | Preferred Range |
| --- | --- | --- |
| Perlitic insulative agent | 2 to 10 | 4 to 8 |
| Plasticizing/coalescing agent | | |
| Dialkyl ester | 0.3 to 3 | 0.5 to 2 |
| Ester alcohol | 0.5 to 5 | 1 to 3 |
| Polyalkene flexibilizing agent | 0.5 to 5 | 1 to 3 |
| Surfactant | | |
| Wetting agent | 0.1 to 2 | 0.5 to 1 |
| Anionic dispersant | 0.2 to 2 | 0.5 to 1 |
| Defoaming agent | | |
| First stage | 0.1 to 2 | 0.3 to 0.8 |
| Final stage | 0.2 to 2 | 0.5 to 1 |
| Glycol freeze/thaw stabilizer | 0.2 to 2 | 0.3 to 0.9 |

Actual amounts may vary depending on various factors. Also, other substances may or may not be present as desired. The paint hereof can be made by a method where at least the aforedescribed steps are carried out. The steps are conducted serially, i.e., one after another in the indicated series. Typically, the method is a batch method. A suitable vessel, with suitable agitation or stirring devices is employed.

To provide the first intermediate mixture, water, first stage defoaming agent, wetting agent, and anionic dispersant are added, generally with mixing, and further mixed. Mixing may be at a suitable speed, for example, a slower speed.

To provide the second intermediate mixture, added to the first intermediate mixture, generally with mixing, are dialkyl ester plasticizing/coalescing agent, glycol freeze/thaw stabilizer, polyalkene flexibilizing agent, and ester alcohol plasticizing/coalescing agent. Mixing may be at a suitable speed, which may be a medium speed.

To provide the third intermediate mixture, high refractive index pigment is added, generally with mixing, to the second intermediate mixture and is thoroughly mixed. Thorough mixing is recommended, and mixing may be at a suitable speed, which may be a medium speed. Preferably, the mixing is under conditions such that no undesirable quantity of air is mixed in with the mixture.

To provide the fourth intermediate mixture, added to the third intermediate mixture, generally with mixing, is at least one extender. Thorough mixing, say, about the speed and under the conditions employed to make the foregoing intermediate mixture, is employed. If more than one extender is added, the incipient mixture is thoroughly mixed after addition of the first extender and before addition of any subsequent extender, and generally, mixing is carried out as for the addition of the first extender. Added thereto, generally with mixing, is the mildewicide/corrosion inhibitor, which is mixed further, say, as with the addition of the extender(s). The incipient intermediate mixture is generally mixed at a rate and for a time sufficient to obtain a smooth grind, free of any large particles. As such, it may be mixed at a higher speed after addition of the components.

To provide the fifth intermediate mixture, added to the fourth intermediate mixture, generally with mixing, is a minor portion of a vinyl acetate-dibutyl maleate type film forming agent, and further added, generally with mixing, is perlitic insulative agent. Mixing is to at least substantial uniformity of the perlitic insulative agent.

To provide the paint formulation of the invention, added to the fifth intermediate mixture, generally with mixing, is a major portion of a vinyl acetate–dibutyl maleate type film forming agent, and added, generally with mixing, is the final stage defoaming agent. Final mixing, often for a fairly short time, to a desired, uniform consistency is then typically carried out.

The prepared paint formulation is then typically tested for quality, and drawn for distribution and use.

Following the method of the invention, a desirable paint mixture is thus afforded. However, when steps of the method are taken out of turn, desirable results typically do not obtain.

The paint can be applied by brushing, rolling, sponging, spraying, and so forth, to a suitable substrate. Preferably, rolling or brushing is carried out to apply the paint.

The paint of the invention is useful in protecting buildings, other structures and components, including those of metal, to include roofs, window frames, door frames, wall panels or beams, exteriors of boilers, storage tanks for water or fuel, ships, and so forth. Accordingly, it may be applied to such substrates upon erection with or without undercoating. Alternatively, it may be applied to metal parts during or after rolling or manufacturing procedures, and so forth. Steel is an advantageous substrate.

Of great significance, paint hereof, with its perlitic component, provides good heat insulation, as from protection from solar radiation or radiative heat loss, which is significantly better than conventional paints. It also can provide good adhesion, especially to metals, good coverage, hiding, toughness and resistance to scratching and weathering, and flexibility.

The following example further illustrates the invention, with parts and percentages being by weight.

EXAMPLE

Component items to make-up a paint of the invention are provided as follows:

| Item | Percent | Material and Function |
|---|---|---|
| 1 | 15.59 | Water-Diluent vehicle component, etc. |
| 2 | 0.41 | FOAMASTER 111 (Henkel Corp.) silicon-free defoamer |
| 3 | 0.59 | TRITON X-100 (Rohm & Haas Co.) octylphenoxypolyethoxyethanol wetting agent |
| 4 | 0.67 | BUSPERSE 39 (Buckman Laboratories Inc.) sodium acrylate oligimer (aqueous mixture, 39% active) anionic dispersant |
| 5 | 1.25 | Dibutyl phthalate plasticizer and coalescent |
| 6 | 0.60 | 1,2-ethanediol glycol freeze/thaw stabilizer |
| 7 | 2.07 | INDOPOL H-100 (Amoco Chemical Co.) polybutene flexibilizer |
| 8 | 2.32 | TEXANOL (Eastman Chemical Co.) solid 2,2,4-trimethyl-1,3-pentanediolmonoisobutyratecoalescing agent |
| 9 | 7.26 | Titanium dioxide CR-822 (Supplier: Kerr McGee) 0.22 micron-size |
| 10 | 5.76 | SANITONE PLUS (Engelhard Corp.) 2.0 micron-size aluminum silicate filler |
| 11 | 2.88 | #1-K mica (Supplier: KMG Minerals) 71 micron-size dry ground mica filler |
| 12 | 5.76 | BUSAN 11-M1 (Buckman Laboratories Inc.) barium metaborate monohydrate mildewicide/corrosion inhibitor |
| 13 | 13.43 | EVERFLEX GT (Tn1 R Grace Co.) vinylacetate-dibutylmaleate film former |
| 14 | 5.20 | CERAMIC SIL 32 (Supplier: Silbrico Corp.) 75 micron-size expanded perlite insulative agent |
| 15 | 35.46 | EVERFLEX GT (as above) |
| 16 | 0.75 | DEFOAMER L-475 (Supplier: Drew Chemical Corp.) nonionic blend of mineral oils and silica derivatives defoamer. |

Therewith, the water-based, insulative paint is made, adding all component items in sequence, as follows:

Add the first four items (Nos. 1, 2, 3 & 4 above) to a batch tank with a Cowles dissolver using a 15" blade running at low speed (670 rotations per minute (rpm)). Mix for a period of at least 2 minutes after the 4th item is added.

With the dissolver adjusted to a medium speed (850 rpm) add the next four items (Nos. 5, 6, 7 & 8 above).

Add the next four items (Nos. 9, 10, 11 & 12 above), one at a time, making certain that each item is thoroughly mixed into the batch before adding the next item. After the 12th item is added increase the dissolver to high speed (1090 rpm). The depth of the blade is adjusted so that the vortex does not suck a substantial quantity of air into the batch. Allow the intermediate mixture to mix at the high speed for 10–15 minutes or until a smooth grind, free from any large particles, is attained.

With continued mixing at the high speed, add the next item (No. 13).

With continued mixing at the high speed, add the next item (No. 14) very slowly. Add it in increments at a rate such that the expanded perlite goes into the batch and does not float on the surface. At the same time, the dissolver blade should be raised gradually as necessary to maintain proper mixing throughout the batch. When all of the 14th item is added, scrape down the sides of the vessel, and allow the batch to mix for approximately 10 minutes or until all large agglomerates are dispersed.

Finally, add the remaining two items (Nos. 15 & 16). Mix for 3–5 minutes.

The dissolver is then turned off, and a sample can be drawn from the batch for quality control testing. A sheet of plastic is laid on the surface of the batch to keep the batch from skinning over for the time it takes to run the following quality control tests for approval of the batch:

The sample is allowed to age at least 16 hours before running quality control tests. The following properties are observed: Viscosity: 123–128 krebs units (reciprocal seconds) at 200 rpm at edge of paddle at 75 degrees F (24 degrees C). Film: Draw down on a black and white hiding chart compared to a standard material, using a draw-down blade with a gap of 0.020 of an inch. Allow to dry at least 16 hours, and check the following:

Color: Equal to standard.
Hiding: Equal to standard.
Texture: Equal to standard.
Toughness and flexibility: Equal to standard using fingernail.

The batch is drawn. It makes an excellent thermal paint.

CONCLUSION

The present invention is thus provided. From the foregoing, it will be seen that this invention is one well adapted to attain all the ends and objects hereinabove set forth together with other advantages attendant thereto.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth is to be interpreted as illustrative and not in a limiting sense.

What is claimed is:

1. A water-based, insulative paint comprising an emulsified aqueous mixture which contains the following components:
   A) A vinyl acetate–dibutyl maleate film forming agent present in an amount from about 40 to 60 parts by weight;
   B) An amount of water sufficient to assist in mixing other components of the paint and to assist in keeping the paint in a state suitable for application;
   C) A pigment present in an amount from about 3 to 12 parts by weight and having a refractive index of at least about 1.5 and an extender present in an amount from about 3 to 18 parts by weight;
   D) A mildewicide/corrosion inhibitor present in an amount of from about 2 to 10 parts by weight;
   E) A perlitic insulative agent present in an amount of from about 1 to 10 parts by weight;
   F) A dialkyl ester plasticizing/coalescing agent and an ester alcohol plasticizing/coalescing agent, present in an amount from about 0.8 to 8 parts by weight;
   G) A polyalkene flexibilizing agent present in an amount from about 0.5 to 5 parts by weight;
   H) A surfactant to include a wetting agent and an anionic dispersant, present in an amount from about 0.3 to 4 parts by weight;
   I) A defoaming agent present in an amount from about 0.3 to 4 parts by weight; and
   J) A glycol freeze/thaw stabilizer present in an amount from about 0.2 to 2 parts by weight.

2. The paint of claim 1, wherein the perlitic insulative agent is expanded perlite.

3. The paint of claim 1, wherein the vinyl acetate dibutyl maleate type film forming agent is a vinyl acetate dibutyl maleate copolymer; the high refractive index pigment is titanium dioxide; the extender is a mixture of an aluminum silicate and a ground mica; the mildewicide/corrosion inhibitor is barium metaborate monohydrate; the perlitic insulative agent is expanded perlite; the dialkyl ester is dibutyl phthalate, and the ester alcohol is 2,2,4-trimethyl-1,3-pentanediol-monoisobutyrate; the polyalkane flexibilizing agent is a polybutene; the surfactant includes a wetting agent of octylphenoxypolyethoxyethanol and an anionic dispersant of a sodium acrylate oligimer; the defoaming agent includes at least one silicon-free compound; and the glycol freeze/thaw stabilizer is 1,2-ethanediol.

4. The paint of claim 3, wherein the film forming agent is present in an amount about from 45 to 55 parts by weight (pbw); the titanium dioxide is present in an amount about from 5 to 9 pbw; the aluminum silicate is present in an amount about from 4 to 8 pbw; and the ground mica is present in an amount about from 2 to 5 pbw; the barium metaborate monohydrate is present in an amount about from 4 to 8 pbw; the expanded perlite is present in an amount about from 4 to 8 pbw; the dibutyl phthalate is present in an amount about from 0.5 to 2 pbw; and the ester alcohol is present in an amount about from 1 to 3 pbw; the polybutene flexibilizing agent is present in an amount about from 1 to 3 pbw; the surfactant is present in an amount about from 0.7 to 1 pbw; the defoaming agent is present in an amount about from 0.8 to 1.8 pbw; and the 1,2-ethanediol is present in an amount about from 0.3 to 0.9 pbw.

5. The paint of claim 1, wherein water is present in an amount of from about 10 to 25 parts by weight.

6. A method of making a water-based, insulative paint comprising an emulsified aqueous mixture, which method comprises serially carrying out the following steps:
   A) Mixing together about 10 to 25 parts by weight water, about 0.1 to 2 parts by weight of a first defoaming agent, about 0.1 to 2 parts by weight of a wetting agent, and about 0.2 to 2 parts by weight of an anionic dispersant to provide a first intermediate mixture;
   B) Adding to the first intermediate mixture and mixing therein about 0.3 to 3 parts by weight of a dialkyl ester plasticizing/coalescing agent, about 0.2 to 2 parts by weight of a glycol freeze/thaw stabilizer, about 0.5 to 5 parts by weight of a polyalkene flexibilizing agent, and about 0.5 to 5 parts by weight of an ester alcohol plasticizing/coalescing agent to provide a second intermediate mixture;
   C) Adding to the second intermediate mixture and thoroughly mixing therein about 3 to 12 parts by weight of a high refractive index pigment to provide a third intermediate mixture;
   D) Adding to the third intermediate mixture and thoroughly mixing therein about 3 to 18 parts by weight of at least one extender, provided that, if more than one extender is added, the mixture is thoroughly mixed after addition of the first extender and before addition of any subsequent extender, and adding thereto about 2 to 10 parts by weight of a mildewicide/corrosion inhibitor, and mixing further to provide a fourth intermediate mixture;
   E) Adding to the fourth intermediate mixture and mixing therein a first portion of a vinyl acetate–dibutyl maleate film forming agent, which first portion is less than a second portion of a vinyl acetate–dibutyl maleate film forming agent to be added later in the method, the first and second portions together being about 40 to 60 parts by weight, and further adding with further mixing about 2 to 10 parts by weight of a perlitic insulative agent to provide a fifth intermediate mixture, and
   F) Adding to the fifth intermediate mixture the second portion of a vinyl acetate–dibutyl maleate film forming agent, which second portion is more than the first portion of a vinyl acetate–dibutyl maleate film forming agent added earlier in the method, and about 0.2 to 2 parts by weight of a final defoaming agent, and mixing to provide said paint.

7. An article of manufacture comprising a substrate and a residue of the paint of claim 1 coated on the substrate.

8. The article of claim 7, wherein the substrate is metal.

9. The article of claim 8, wherein the metal is steel.

10. The article of claim 7, wherein an undercoat is present.

* * * * *